March 6, 1945. T. A. GADWA 2,370,948
STYRENE FRACTIONATION
Filed May 5, 1942
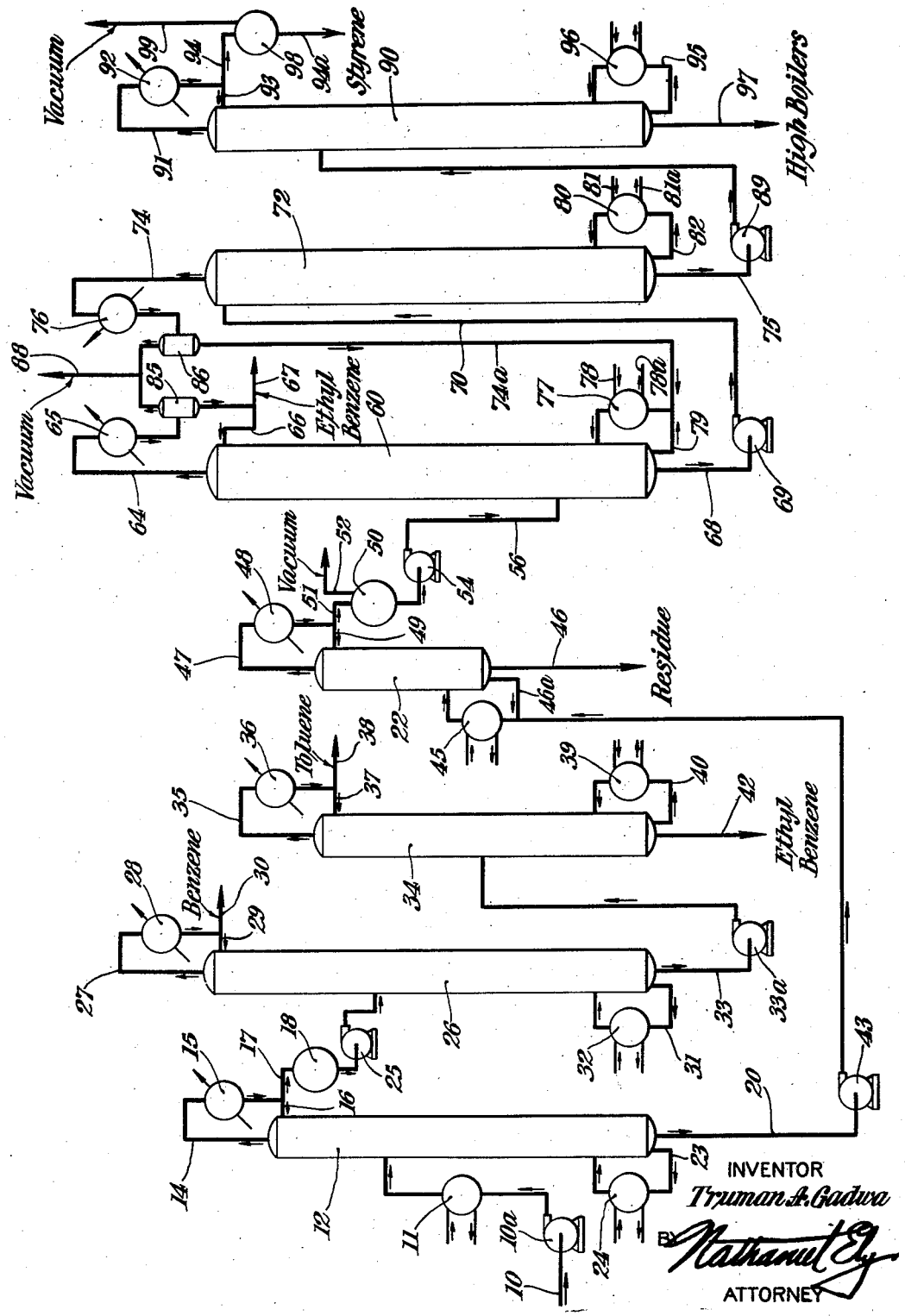
INVENTOR
Truman A. Gadwa
BY Nathaniel Ely
ATTORNEY Patented Mar. 6, 1945

2,370,948

UNITED STATES PATENT OFFICE 2,370,948

STYRENE FRACTIONATION

Truman A. Gadwa, Mount Vernon, N. Y., assignor to The Lummus Company, New York, N. Y., a corporation of Delaware Application May 5, 1942, Serial No. 441,853

7 Claims. (Cl. 202—52)

This invention relates to the production of styrene of a grade suitable for the manufacture of synthetic rubber.

The present war situation has made it increasingly necessary to produce large amounts of styrene in an economical and efficient manner. Prior laboratory scale and pilot plant scale operations have required considerable revision in the interest of efficiency and suitably large scale operation, for a single unit of commercial size may be called upon to produce as much as 20,000 tons of styrene per year. The magnitude of such a unit has never before been considered, and it involves the extrapolation of data far beyond those available. Furthermore, units of this size must be based upon production from basic raw materials, which must be processed through several stages in order to obtain the desired quantities of styrene.

More particularly, it has been found desirable to utilize materials such as propane and benzene as the principal raw materials from which the styrene is made. Such propane is appropriately cracked to produce ethylene, which is then alkylated with the benzene to produce ethyl benzene. The ethyl benzene is then subjected to a suitable dehydrogenation treatment for the formation of the desired styrene.

The product from this dehydrogenation step comprises a mixture containing benzene, toluene, unconverted ethyl benzene, styrene, isopropyl benzene, higher boiling substances (high boilers), and a residue of still higher boiling material of an exceedingly complex nature. Distillation of this mixture of saturated and unsaturated compounds with their mutual solubilities to effectively separate styrene therefrom is rendered extremely difficult because of the relatively close boiling points of the several compounds and because of the tendency of styrene to rapidly polymerize when it is subjected to heat. It is commonly stated, for example, that styrene can not be recovered from a styrene-containing mixture containing ethyl benzene by usual distillation methods.

It is the primary object of my invention to efficiently obtain styrene from a mixture thereof with other materials whereby styrene of substantial purity is recovered and whereby the remaining materials are available for commercial use.

One of the principal objects of this invention is to provide an improved fractional distillation process for the separation of a synthetic styrene-containing mixture to obtain a high yield of styrene having a high degree of purity without undue polymerization of the styrene during the distillation and a suitable series of other products also of a substantial purity.

Further objects and advantages of my invention will appear from the following description of a preferred form of embodiment thereof taken in connection with the attached drawing, which is a diagrammatic flow sheet of a system for separating a styrene-containing mixture by means of my invention.

In accordance with my invention, I provide a distillation system comprising a series of interrelated distillation stages for the purpose of producing a high purity styrene from a styrene-containing mixture such as the synthetic mixture produced by the dehydrogenation of ethyl benzene. Such a synthetic mixture may consist substantially of the following materials:

|  | Range | Example |
|---|---|---|
|  | Per cent | Per cent |
| Benzene | 6–8 | 6.5 |
| Toluene | 4–6 | 4.8 |
| Ethyl benzene | 55–66 | 63.3 |
| Styrene | 20–25 | 20.6 |
| Isopropyl benzene |  | .3 |
| High boilers | 4–6 | .8 |
| Residue |  | 3.7 |

The mixture, which constitutes the feed to the distillation system, is passed as by pump 10a through conduit 10 and the heater 11, wherein it is suitably preheated, and is introduced into the first fractionating column 12. In this column a separation is made between the relatively low-boiling material consisting of the benzene and the toluene as overhead and the relatively high-boiling material consisting of the ethyl benzene, the styrene, and the higher boiling materials as bottoms. The conditions are desirably so maintained that only a small portion of the ethyl benzene and a trace of the styrene appear in the overhead and only a relatively small portion of the toluene appears in the bottoms. The overhead is removed through and is condensed in condenser 15. A part of the resulting condensate is returned as reflux for column 12 through line 16, and the remainder is conducted through line 17 to accumulator tank 18. The bottoms from column 12 is removed through line 20 and is fed into the fourth or flash column 22. A portion of the bottoms is desirably circulated by means of line 23 through the reboiler 24 to supply heat to column 12. The separation in this column is preferably carried out at substantially atmospheric pressure.

The relatively low-boiling material is removed from accumulator tank 18 and is pumped by means of pump 25 into the second column 26, wherein a separation is made between the benzene as overhead and the toluene and ethyl benzene as bottoms. Conditions in column 26 are desirably so maintained that only a trace of toluene appears in the overhead and only a trace of benzene and the styrene appear in the bottoms. The overhead is removed through line 27 for condensation in condenser 28, part of the condensate from which is returned through line 29 as reflux for column 26. The remainder of this benzene condensate is removed through line 30 and may be recycled to the benzene-ethylene alkylation stage. A portion of the bottoms is desirably circulated by means of line 31 through reboiler 32 to supply heat to column 26. This column is also preferably operated at atmospheric pressure.

The bottoms from column 26 is removed through line 33 and is introduced by means of pump 33a into the third column 34, in which a separation between the toluene and the ethyl benzene is effected. The distillation conditions are desirably maintained such that the trace of benzene contained in the feed to this column and only a trace of ethyl benzene appear in the overhead and only a trace of toluene and the styrene appear in the bottoms. The toluene overhead is removed through line 35 and is condensed in condenser 36, a part of the condensate from which is returned as reflux for column 34 through line 37. The toluene product is removed through line 38 and has such a degree of purity that it can be used for nitration purposes. Heat may be supplied to column 34 by circulating a portion of the bottoms therefrom through reboiler 39 by means of line 40. The bottoms product comprising primarily ethyl benzene is removed through line 42 and may be recirculated to the ethyl benzene dehydrogenation stage.

As previously indicated, the ethyl benzene-styrene bottoms from column 12 is introduced into the fourth column 22 through line 20 by means of pump 43. The bottoms stream is preferably sufficiently preheated in heater 45 so that it can be flashed within column 22 to separate the ethyl benzene and the styrene from the higher boiling materials. This flashing operation is so carried out that the trace of toluene contained in the feed to this column and some of the isopropyl benzene and the high boilers appear in the overhead and traces of ethyl benzene and styrene and some of the isopropyl benzene and high boilers appear in the bottoms. The bottoms stream containing all the residue is removed from column 22 through line 46. A portion of the bottoms from this column may be recirculated through heater 45 by means of line 46a. The ethyl benzene-styrene overhead is removed through line 47 for condensation in the condenser 48. A portion of the resulting condensate is returned through line 49 to column 22 as reflux, and the remainder is conducted to accumulator 50 through line 51. Column 22 is desirably operated under a vacuum preferably on the order of 50 mm. Hg absolute pressure, and a vacuum connection 52 may be provided on accumulator 50 to produce the desired degree of vacuum.

In accordance with my invention, the condensate from accumulator 50 is pumped by means of pump 54 through line 56 into a distillation system comprised of a plurality of separate but interrelated distillation zones for the purpose of effectively separating the ethyl benzene from the styrene without undesirable polymerization of the styrene. As previously indicated, the charge to this distillation system consists generally of a trace of toluene, the major portion of the ethyl benzene, some of the isopropyl benzene, substantially all of the styrene, and some of the high boilers. A typical analysis of such charge is as follows:

| | Per cent |
|---|---|
| Toluene | —0.4 |
| Ethyl benzene | —72.6 |
| Styrene | —26.2 |
| Isopropyl benzene | —0.3 |
| High boilers | —0.6 |

In the past it has proved commercially impossible to have any quantitative separations of the styrene from the ethyl benzene by simple distillation because of the unsaturated nature of styrene, which tends to polymerize at relatively low temperatures and polymerizes more rapidly with the application of heat even if inhibitors are used. In addition, the relatively close boiling points of styrene and ethyl benzene tend to interfere with a good separation between these two materials. According to my invention, it is now possible to obtain by distillation a high purity styrene in a relatively high yield and substantially all deleterious polymerization of the styrene is avoided.

In accordance with a preferred form of embodiment of my invention, the ethyl benzene-styrene distillation system consists of two distillation zones entirely separated from each other. The feed from accumulator 50 is fed into column 60 wherein a separation is effected between ethyl benzene as the overhead and an ethyl benzene-styrene concentrate as the bottoms. This feed may be introduced at any other point in the distillation system, if desired, preferably in accordance with its composition. Column 60 is provided with bubble decks, the number of which is selected with respect to the total pressure drop desired through the column so that the temperature corresponding to the effective pressure at the bottom of the column will not be so high as to cause a substantial degree of undesirable polymerization of the styrene.

The overhead from column 60 is removed through line 64 and is condensed in condenser 65, the condensate from which is collected in accumulator 85. A portion of this condensate is returned through line 66 as reflux for column 60, and the remainder is removed from the system through line 67. The distillation conditions in column 60 are desirably so maintained that this ethyl benzene product contains the toluene in the feed to this column and only a very small portion of the styrene. This ethyl benzene product may be recirculated to the ethyl benzene dehydrogenation stage for the formation of further styrene. Heat may be supplied to column 60 by circulating a portion of the bottoms therefrom through reboiler 77 as by means of line 79. Steam may be introduced into reboiler 77 through line 78 with the condensate removed through line 78a.

The bottoms from column 60 is removed through line 68 and is pumped by means of pump 69 through line 70 into the top of column 72, the second stage of my improved ethyl benzene-styrene distillation system. This bottoms stream comprises substantially all the styrene admixed with some of the ethyl benzene, which is separated from the styrene in column 72 by means of a stripping action. In column 72 a separation is made between an ethyl benzene-styrene mixture as the overhead and a styrene concentrate as the bottoms. Conditions in column 72 are desirably so maintained that only a trace of ethyl benzene and the isopropyl benzene and high boilers appear in the styrene bottoms stream. Column 72 is also provided with bubble decks, the number of which is so selected that the effective pressure maintained at the bottom of the column corresponds to a temperature which will not effect undesirable polymerization of the styrene to a substantial degree. A portion of the bottoms from column 72 may be circulated through reboiler 80 as by means of line 82 to supply heat to the column. Steam may be introduced into reboiler 80 through line 81 with the condensate removed through line 81a.

The ethyl benzene-styrene overhead from column 72 is removed through line 74 and is entirely condensed in condenser 76, the condensate from which is collected in accumulator tank 86. This condensate is passed through line 74a to reboiler 77 wherein it is partially or completely vaporized. The resulting vapors are then introduced into the bottom of column 60.

Columns 60 and 72 are both maintained under a substantial vacuum, which may be in the order of 50 mm. Hg absolute pressure. The necessary vacuum may be independently applied to each column, but a common manifold 88 may connect the two columns with the vacuum-producing system. The application of a substantially low absolute pressure to the top of both columns is a fundamental feature of my invention in that such operation permits a sufficiently low temperature to be maintained throughout columns 60 and 72 so that substantially no undesirable polymerization of styrene takes place therein. In the design of a particular plant embodying my invention, I found that, with the use of this two-stage distillation system, I was able to reduce the temperature of the styrene bottoms product removed from column 72 through line 75 by approximately 20° F.; a decrease in styrene polymerization resulted, and an improvement in the fractionation occurred. With the system as described, the pressure drop in each distillation column can be kept at a minimum with a resulting substantially lower overall pressure drop between the respective ends of the distillation system. It is, therefore, possible to maintain throughout the distillation system a sufficiently low absolute pressure to prevent any substantial degree of undesirable polymerization of the styrene.

It will be seen that the ethyl benzene-styrene mixture is thus given a two-stage separation in the respective distillation columns 60 and 72. The maximum difference in pressure between the top and the bottom of the respective columns arising from the pressure drop through the multiplicity of decks therein is not great, however, since each column is subjected to a vacuum, which arrangement is made possible by the separate condensation of the overhead vapors from each column. Although columns 60 and 72 are thus operated separately, they are also operated in an interrelated manner in that the overhead condensate from column 72 is revaporized and the resulting vapors are introduced into the bottom of column 60 and in that the bottoms from column 60 is introduced into the top of column 72 wherein it serves as reflux. Without such separate operation of these two columns, the pressure at the bottom of column 72 could not be lowered so as to obtain the desired reduction in temperature at this point. It is possible under such circumstances to obtain a styrene fraction having the desired purity or concentration as the bottoms stream removed from column 72 through line 75.

Although I have described the separation of the ethyl benzene-styrene mixture as being effected in a two-column distillation system, it will be appreciated that this separation may also be effectively carried out in a plurality of columns operating in this manner. If it is desirable to do so on an economic basis, this separation process may be carried out in a single multisection column, in which the sections are separate from each other.

The styrene concentrate obtained as the bottoms stream from column 72 is removed therefrom through line 75 and is pumped by means of pump 89 into the final distillation column 90. In this column the styrene is separated from the greater portion of the isopropyl benzene and the high boilers associated therewith. The operating conditions in column 90 are so maintained that a trace of ethyl benzene and a small portion of the isopropyl benzene and the high boilers appear in the styrene overhead and only a very small amount of styrene appears in the bottoms stream. The styrene overhead is removed through line 91 for condensation in condenser 92. A portion of the resulting condensate is returned through line 93 to column 90 to serve as reflux therefor and the remainder of the condensate is conducted to the accumulator tank 98, from which the styrene is withdrawn through line 94a. The bottoms stream, comprising a greater portion of the isopropyl benzene and the high boilers in the feed to column 90, is removed therefrom through bottoms line 97. Heat may be supplied to column 90 by circulating a portion of the bottoms therefrom as by means of line 95 through reboiler 96. Column 90 is preferably operated under a vacuum in the order of 50 mm. Hg absolute pressure in order that a sufficiently low temperature may be maintained within column 90 to prevent undue polymerization of the styrene. For this purpose, a vacuum connection 99 is provided for accumulator 98.

The distillation system as above described has certain operating advantages which make its application to the recovery of styrene by distillation particularly desirable. By effecting a separation in column 12 between the lighter material (benzene and toluene) and the heavier material (ethyl benzene and styrene), I subject the styrene to the minimum number of heating steps and to the minimum time of heating whereby the possibility for the styrene to polymerize because of the heating is materially lessened. By maintaining a minimum amount of hold-up liquid on each bubble deck, I not only obtain efficient fractionation, but I also reduce the polymerization of the styrene still further since the time during which the styrene is subjected to heat is reduced to a minimum thereby.

I have also found that the separation in column 12 is desirably so carried out that a portion of the ethyl benzene is removed in the overhead benzene-toluene stream. Such operation tends to reduce the condensing load on condenser 65 for column 60, which is operated under a substantial vacuum. In addition, the size of columns 60 and 72 can be reduced thereby because of the smaller amount of ethyl benzene to be handled therein. In one instance I found that a separation in column 12 whereby approximately 10% of the ethyl benzene was removed overhead therefrom was extremely satisfactory. The operation in the flash fractionation column 22 may also be so varied as to effect the operating conditions in the final column 90. I have found it desirable, however, to remove overhead from column 22 a portion of the isopropyl benzene and the high boilers so as to reduce the loss of styrene in the bottoms from column 22. In the operation of column 22, I have also found it desirable to effect some degree of fractionation, for which purpose the desired number of fractionating decks may be installed therein. It may also be desirable to employ some stripping decks in the lower portion of column 22 to further reduce the loss of styrene in the bottoms therefrom; in such case the degree of flashing of the incoming feed to this column can be considerably reduced. The use of this column 22 enables me to eliminate the high boilers and the residue from the system before they can interfere with efficient reboiling of the styrene bottoms streams.

My invention is also applicable to the separation of other styrene-containing mixtures. A typical example of such a mixture is the styrene-containing fraction derived from the drip oil recovered in the manufacture of artificial gas or from the coal tar distillate produced in the coking of coal. Such a fraction may have the following composition, for example:

| | Per cent |
|---|---|
| Ethyl benzene | 2 |
| Paraxylene | 15 |
| Metaxylene | 35 |
| Orthoxylene | 5 |
| Styrene | 27 |
| Propyl benzenes | 10 |
| Trimethyl benzenes | 2 |
| Olefins | 5 |
| Paraffins | 2 |
| Higher-boiling components | 1 |

In the separation of such a fraction, it may be desirable to effect a preliminary separation of the ethyl benzene. The styrene-containing fraction is then subjected to the multistage distillation system comprising two or more columns such as columns 60 and 72. In such a case, the xylenes are removed as the overhead product and the styrene concentrate is again removed as the bottoms product from this multistage distillation system. The styrene concentrate is then desirably subjected to a further distillation for the separation therefrom of the propyl benzenes and the higher-boiling materials. The multistage distillation system in this case is also operated under a substantial vacuum so as to provide sufficiently low temperatures throughout the distillation system to avoid undue polymerization of the styrene. In this case, however, the application of the multistage distillation system has another advantage in that the separation of the xylenes from the styrene can be more readily effected therein because of the lower pressure drop through the system. Since the xylenes and the styrene have relatively close boiling points at atmospheric pressure and have vapor pressure curves that converge with an increase in absolute pressure, and, since the degree of enrichment between the liquid and the vapor in the distillation of a mixture of these materials is small and decreases with an increase in pressure, it will be appreciated that this multistage distillation system with its lower decrease in effectiveness of the vacuum applied thereto provides improved conditions for the separation of such a close boiling mixture.

My invention is also applicable to the separation of other polymerizable vinyl aromatic compounds from a mixture with close boiling, substantially nonpolymerizable aromatic compounds. As will be noted from the compositions of the two styrene mixtures given above, the styrene-containing fraction is desirably so prepared that the major portion of the nonpolymerizable aromatic compound boils slightly below the boiling point of the styrene or other vinyl aromatic compound. Other suitable polymerizable vinyl aromatic compounds include methyl styrene, chlorinated derivatives of styrene, and the like.

Although I have described a preferred procedure for carrying out my invention, it will be apparent that modifications may be made thereto. Accordingly, only such limitations as appear in the claims appended hereinafter should be applied.

I claim:

1. In the separation of a styrene-containing mixture without any appreciable polymerization of the styrene because of heat, said mixture being derived from the dehydrogenation of ethyl benzene to styrene and including benzene, toluene, ethyl benzene, and higher boiling materials, the steps which comprise effecting a primary distillation of such mixture under substantially atmospheric pressure to separate the toluene and lower boiling materials as overhead from the ethyl benzene and higher boiling materials as bottoms, subjecting the toluene-containing overhead to a further distillation under substantially atmospheric pressure to separate the benzene from the toluene therein, distilling the bottoms from the first distillation under a substantial vacuum to separate the ethyl benzene and styrene as overhead from the major portion of the higher boiling materials as bottoms, introducing the ethyl benzene-styrene overhead into the first stage of a two stage distillation system, each stage of which is maintained under a substantial but independent vacuum, whereby the temperature of distillation is maintained sufficiently low to prevent undue polymerization of the styrene, removing ethyl benzene as the overhead from this first stage, removing the bottoms stream from this first stage and introducing it into the top of the second stage to serve as reflux therein, condensing the overhead vapors from this second stage and revaporizing the resulting condensate and introducing the resulting vapors into the bottom of the first stage, removing a styrene concentrate as the bottoms from the second stage, and further distilling this styrene concentrate under a substantial vacuum to separate substantially pure styrene as overhead from the remaining high-boiling materials as bottoms.

2. In the method for the separation by distillation of a polymerizable vinyl aromatic compound into a fraction having a predetermined concentration without any appreciable polymerization of the polymerizable vinyl aromatic compound because of heat, said vinyl aromatic compound being admixed with close-boiling substantially nonpolymerizable aromatic compounds, the major portion of which boils slightly below the boiling point of the vinyl aromatic compound, the steps which comprise continuously feeding such mixture to a distillation system at a point corresponding to its composition, said system being composed of a plurality of separate but interrelated distillation zones, said distillation zones together having a combined total pressure drop such that the resulting increase in pressure corresponds to a temperature that would cause undesirable polymerization of the vinyl aromatic compound, maintaining an independent vacuum on each zone, condensing the overhead distillate from each zone, revaporizing the overhead condensate from each zone but the last and feeding the resulting condensate vapors to the bottom of the next subsequent distillation zone, the overhead condensate from the last distillation zone containing the nonpolymerizable aromatic compounds, withdrawing the bottoms from each distillation zone but the first and refluxing the next preceding distillation zone therewith, and withdrawing the bottoms from the first distillation zone, said bottoms comprising substantially the polymerizable vinyl aromatic compound in the predetermined concentration.

3. In the method for the separation by distillation of styrene without any appreciable polymerization of the styrene because of heat, said styrene being admixed with close-boiling substantially nonpolymerizable aromatic compounds, the major portion of which boils slightly below the boiling point of styrene, the steps which comprise continuously feeding such mixture to a distillation system at a point corresponding to its composition, said system being composed of two separate but interrelated distillation zones, said distillation zones together having a combined total pressure drop such that the resulting increase in pressure corresponds to a temperature that would cause undesirable polymerization of the styrene, maintaining an independent vacuum on each zone, condensing the overhead distillate from each zone, revaporizing the overhead condensate from one of said zones and feeding the resulting vapors to the bottom of the second zone, the overhead condensate from the second zone comprising substantially the nonpolymerizable aromatic compounds, withdrawing the bottoms from the second zone and refluxing the first zone therewith, and withdrawing the bottoms from the first zone, said bottoms comprising substantially the styrene.

4. The method as claimed in claim 3, in which the close-boiling substantially nonpolymerizable aromatic compounds are comprised primarily of ethyl benzene.

5. In the method for the separation by distillation of styrene without any appreciable polymerization of the styrene because of heat, said styrene being admixed with close-boiling substantially nonpolymerizable aromatic compounds, the major portion of which boils slightly below the boiling point of styrene, the components of such mixture having relatively close-boiling points at atmospheric pressure and having vapor pressure curves that converge with an increase in absolute pressure, the degree of enrichment between liquid and vapor being small and decreasing with an increase in pressure, the steps which comprise continuously feeding such mixture to a distillation system at a point corresponding to its composition, said system being composed of two separate but interrelated distillation zones, said distillation zones together having a combined total pressure drop such that the resulting increase in pressure corresponds to a temperature that would cause undesirable polymerization of the styrene and such that the resulting increase in pressure would render the degree of enrichment negligible before the predetermined separation could be effected, maintaining an independent vacuum on each zone, condensing the overhead distillate from each zone, revaporizing the overhead condensate from one of said zones and feeding the resulting vapors to the bottom of the second zone, the overhead condensate from the second zone comprising substantially the nonpolymerizable aromatic compounds, withdrawing the bottoms from the second zone and refluxing the first zone therewith, and withdrawing the bottoms from the first zone, said bottoms comprising substantially the styrene.

6. The method as claimed in claim 5, in which the close-boiling substantially nonpolymerizable aromatic compounds are comprised primarily of the xylenes.

7. The method as claimed in claim 1, which includes removing approximately 10% of the ethyl benzene along with the benzene-toluene overhead from the primary distillation and subsequently separating such ethyl benzene from the toluene.

TRUMAN A. GADWA.